United States Patent
Lu

(10) Patent No.: US 7,664,065 B2
(45) Date of Patent: Feb. 16, 2010

(54) MULTICAST SYSTEM AND METHOD FOR UTILIZING THE SAME

(75) Inventor: Chi-Ming Lu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 316 days.

(21) Appl. No.: 11/558,475

(22) Filed: Nov. 10, 2006

(65) Prior Publication Data

US 2007/0195771 A1 Aug. 23, 2007

(30) Foreign Application Priority Data

Feb. 17, 2006 (TW) .................................. 95105455

(51) Int. Cl.
*H04H 20/71* (2008.01)
*H04L 12/28* (2006.01)
*H04J 3/26* (2006.01)

(52) U.S. Cl. ...................... 370/312; 370/390; 370/432

(58) Field of Classification Search .................. 370/349
See application file for complete search history.

(56) References Cited

U.S. PATENT DOCUMENTS

| | | | | |
|---|---|---|---|---|
| 5,331,637 | A * | 7/1994 | Francis et al. ................ 370/408 |
| 6,208,647 | B1 * | 3/2001 | Deng et al. ................... 370/390 |
| 6,647,020 | B1 * | 11/2003 | Maher et al. .................. 370/432 |
| 6,850,495 | B1 * | 2/2005 | Baum et al. ................... 370/256 |
| 7,170,868 | B2 * | 1/2007 | Phillips et al. ............... 370/312 |
| 7,454,518 | B1 * | 11/2008 | Cain et al. ................... 709/238 |
| 2001/0018714 | A1 * | 8/2001 | Yagyu et al. ................. 709/245 |
| 2001/0034793 | A1 * | 10/2001 | Madruga et al. ............. 709/238 |
| 2002/0023150 | A1 * | 2/2002 | Osafune et al. .............. 709/221 |
| 2002/0056126 | A1 * | 5/2002 | Srikantan et al. .............. 725/87 |
| 2003/0026240 | A1 * | 2/2003 | Eyuboglu et al. ............ 370/349 |
| 2003/0152098 | A1 * | 8/2003 | Zhu ............................. 370/432 |
| 2003/0233455 | A1 * | 12/2003 | Leber et al. .................. 709/226 |
| 2004/0168052 | A1 * | 8/2004 | Clisham et al. .............. 713/153 |
| 2005/0117576 | A1 * | 6/2005 | McDysan et al. ............ 370/389 |
| 2005/0198351 | A1 * | 9/2005 | Nog et al. .................... 709/232 |
| 2006/0034280 | A1 | 2/2006 | Uno |
| 2006/0045089 | A1 * | 3/2006 | Bacher et al. ................ 370/392 |
| 2006/0133408 | A1 * | 6/2006 | Nogueira-Nine et al. .... 370/447 |
| 2006/0271780 | A1 * | 11/2006 | Oswal et al. ................. 713/163 |
| 2006/0291467 | A1 * | 12/2006 | Henry et al. ................. 370/390 |
| 2007/0064718 | A1 * | 3/2007 | Ekl et al. ..................... 370/432 |
| 2007/0076715 | A1 * | 4/2007 | Bauer et al. .................. 370/390 |
| 2007/0110024 | A1 * | 5/2007 | Meier .......................... 370/351 |
| 2007/0127473 | A1 * | 6/2007 | Kessler et al. ................ 370/390 |
| 2007/0217416 | A1 * | 9/2007 | Okuda ......................... 370/390 |
| 2007/0250890 | A1 * | 10/2007 | Joshi et al. ................... 725/120 |
| 2009/0034540 | A1 * | 2/2009 | Law ............................. 370/400 |

* cited by examiner

*Primary Examiner*—Alpus H Hsu
*Assistant Examiner*—Jessica Clifton
(74) *Attorney, Agent, or Firm*—Wei Te Chung

(57) ABSTRACT

A multicast system is provided. The multicast system includes a multicast processing module and a multicast service module. The multicast processing module is for subscribing to the multicast service module. The multicast service module is for sending a subscribe response to the multicast processing module, and for transmitting data to the multicast processing module via a unicast frame. The multicast processing module is also for identifying a data initiator according to the subscribe response, and for receiving the data from the multicast service module in a multicast mode. A multicast method utilized in the multicast system is also provided.

12 Claims, 5 Drawing Sheets

MULTICAST SYSTEM AND METHOD FOR UTILIZING THE SAME

BACKGROUND OF THE INVENTION

1. Field of the Invention

The invention generally relates to a multicast system and a method for utilizing the same, and particularly to a multicast system and a method used in a wireless network.

2. Description of Related Art

According to the Institute of Electrical and Electronics Engineers (IEEE) 802.11 protocol, when an access point transmits a multicast frame, if a receiving station is in a power saving mode, the access point must first buffer transmitted data, and then wait for a delivery traffic indication message (DTIM) to resend a transmitted frame, thus transmission speed may be lowered or the frame may be delayed. Moreover, since there is no acknowledgement (ACK) mechanism for the medium access control (MAC) layer of the multicast frame, transmission reliability is substantially decreased.

SUMMARY OF THE INVENTION

A multicast system is provided. The multicast system includes a multicast processing module and a multicast service module. The multicast processing module is for subscribing to the multicast service module. The multicast service module is for sending a subscribe response to the multicast processing module, and for transmitting data to the multicast processing module via a unicast frame. The multicast processing module is also for identifying whether the multicast processing module is a data initiator according to the subscribe response, and for receiving the data from the multicast service module in a multicast mode if the multicast processing module is the data initiator, or receives the data from the multicast service module in a promiscuous mode if the multicast processing module is not the data initiator.

A multicast method is also provided. The multicast method is applicable for a multicast system including a multicast service module and a multicast processing module. The multicast method includes: the multicast processing module subscribing to the multicast service module; the multicast service module sending a subscribe response to the multicast processing; the multicast processing module identifying whether the multicast processing module itself is a data initiator according to the subscribe response from the multicast service module; and the multicast service module sending the data to the multicast processing module via a unicast frame, and the multicast processing module receiving the data from the multicast service module in a multicast mode if the multicast processing module is the data initiator, or receiving the data from the multicast service module in a promiscuous mode if the multicast processing module is not the data initiator.

Other advantages and novel features will become more apparent from the following detailed description when taken in conjunction with the accompanying drawings, in which:

DETAILED DESCRIPTION OF THE INVENTION

Figure 1:
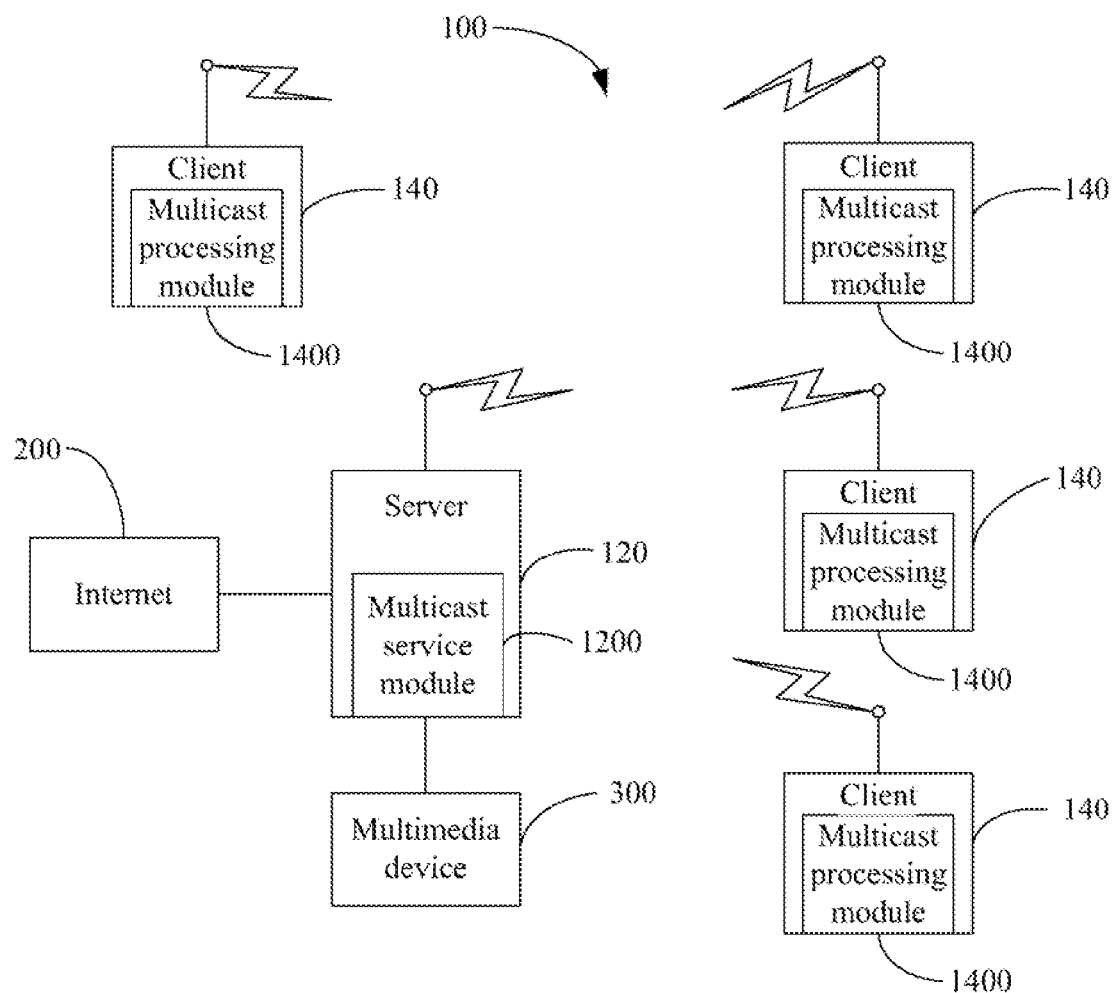
FIG. 1 is schematic diagram of a multicast system of an exemplary embodiment of the invention.

Referring to FIG. 1, a schematic diagram of a multicast system 100 of an exemplary embodiment of the invention is shown.

In this embodiment, the multicast system 100 is applicable to a wireless network including a server 120 and a client 140. Each server 120 includes a multicast service module 1200, and each client includes a multicast processing module 1400. Although only four multicast processing modules 1400 are shown in FIG. 1, it should be understood that the invention is not limited to that number.

The server 120 is communicated with a multimedia device 300, and the server 120 may be an access point (AP), a wireless gateway, and so on. The multimedia device 300 may be a digital video disc (DVD) player, video camera, and so on. The client 140 is wirelessly communicated with the server 120 via the Internet 200, and the client 140 may be a personal computer (PC), a personal digital assistance (PDA), and so on. Both the server 120 and the client 140 are capable of supporting IEEE 802.11 wireless local area network (WLAN) standard.

The multicast processing module 1400 sends requests to the multicast service module 1200. The requests include a query media request, a subscribe media request, a start media request, a keep-alive request, and an unsubscribe media request.

The multicast service module 1200 sends responses to the multicast processing module 1400. The responses include a query media response, a subscribe media response, a start media response, and an unsubscribe media response.

The multicast service module 1200 further transmits data taken from the Internet 200 or the multimedia device 300. The data may include video data and audio data, such as MPEG-format movies and MP3-format songs. In this embodiment, the multicast service module 1200 transmits the data via a unicast frame.

The multicast processing module 1400 receives the data from the multicast service module 1200. Data receiving modes include a promiscuous mode and a multicast mode.

The multicast processing module 1400 further determines whether a timeout occurs. In this embodiment, the timeout indicates the multicast service module 1200 stops transmitting the data to the multicast processing module 1400.

The multicast processing module 1400 still further changes an address thereof. In this embodiment, the address is a medium access control (MAC) address.

Table 1 below is an example of a multicast table pre-stored in the multicast service module 1200. The multicast table includes four fields: a media identification (ID) field, a data initiator field, a subscriber list field, and a media description field. The media ID field lists ID codes of data. In this embodiment, the ID code is the MAC address. The data initiator field lists MAC addresses of a multicast processing module 1400 that initially subscribes and is referred to as "data initiator". The subscriber list field lists MAC addresses of multicast processing modules 1400 that subsequently subscribe. The media description field is for listing a data source.

| Media ID | Data initiator | Subscriber list | Media description |
|---|---|---|---|
| 40 | 400 | 400, 700 | Internet |
| 50 | 600 | 600, 900 | DVD player |
| 60 | 500 | 500, 800 | Video camera |

Table 1

Figure 2:
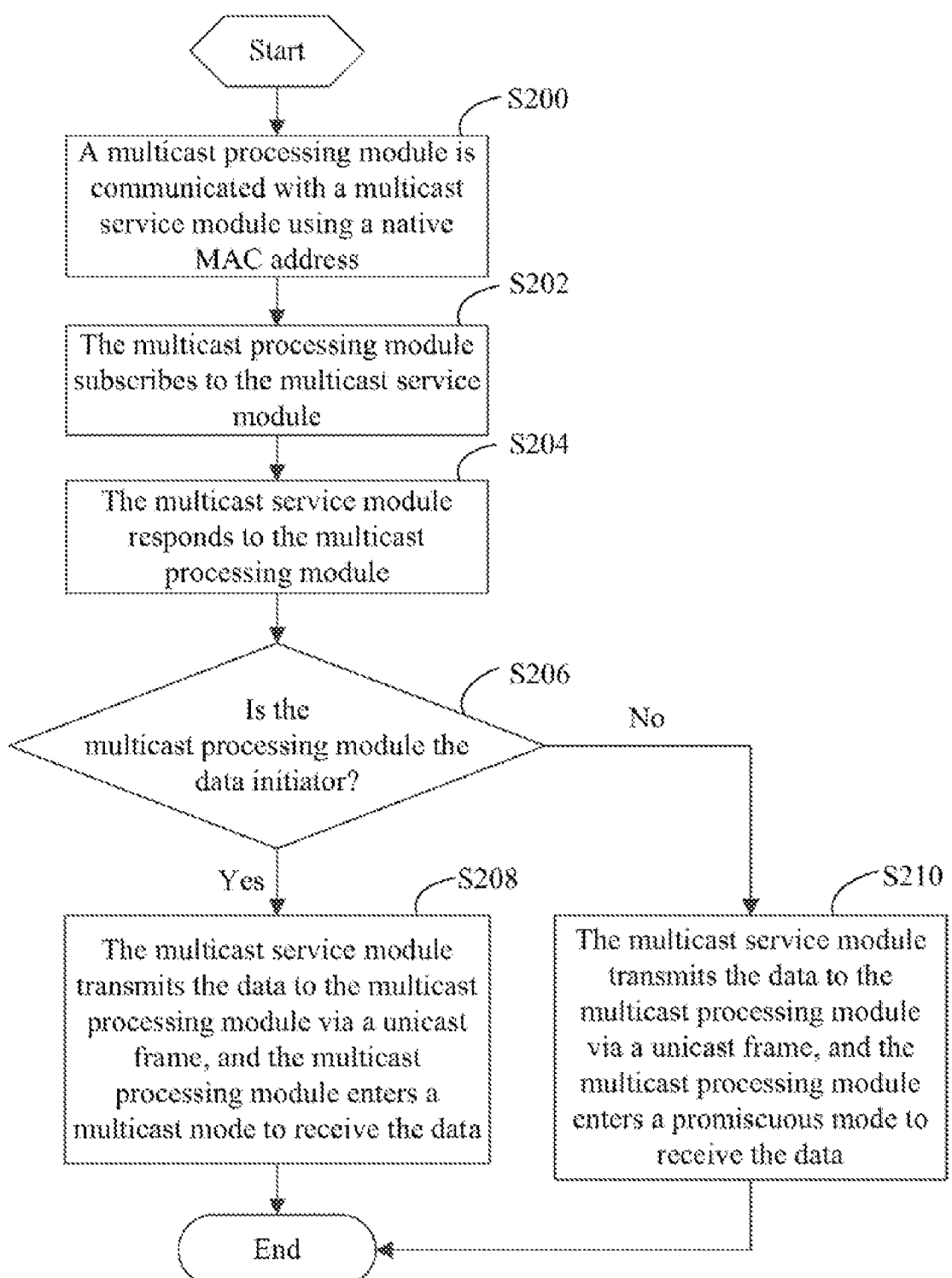
FIG. 2 is a flowchart of a multicast method of another exemplary embodiment of the invention.

FIG. 2 is a flowchart of a multicast method of another exemplary embodiment of the invention. The multicast service module 1200 assigns ID codes to multicast media data from data sources respectively as exemplarily listed in table 1. The ID codes are unique and different from each other.

In step S200, the multicast processing module 1400 is communicated with the multicast service module 1200 using a native MAC address.

In step S202, the multicast processing module 1400 subscribes to the multicast service module 1200 according to assigned ID codes.

In step S204, the multicast service module 1200 responds to the multicast processing module 1400. In this embodiment, the multicast service module 1200 first queries a multicast table to determine whether the multicast processing module 1400 is a data initiator, and then sends a subscribe response including a query result to the multicast processing module 1400.

In step 206, the multicast processing module 1400 determines whether the multicast processing module 1400 itself is the data initiator based on the response.

If the multicast processing module 1400 itself is the data initiator, the process proceeds to step S208, where the multicast service 1200 transmits the data to the multicast processing module 1400 via a unicast frame, and the multicast processing module 1400 enters a multicast mode to receive the data. As shown in Table 1, since the multicast processing module 1400 with a MAC address of 400 is the data initiator, the multicast processing module 1400 with a MAC address of 400 enters the multicast mode to receive the data.

If the multicast processing module 1400 is not the data initiator, the process proceeds to step S210, where the multicast service module 1200 transmits the data to the multicast processing module 1200 via the unicast frame, and the multicast processing module 1400 enters a promiscuous mode to receive the data. As shown in Table 1, since the multicast processing module 1400 with a MAC address of 700 is not the data initiator, the multicast processing module 1400 with a MAC address of 700 enters the promiscuous mode to receive the data.

In the promiscuous mode, the multicast processing module 1400 first receives data from the Internet, then discards all unnecessary data, and only keeps required data. For example, the multicast processing module 1400 may receive a data 40, data 50, and data 60 from the Internet, then discard the data 50 and the data 60, and only keep the data 40.

Figure 3:
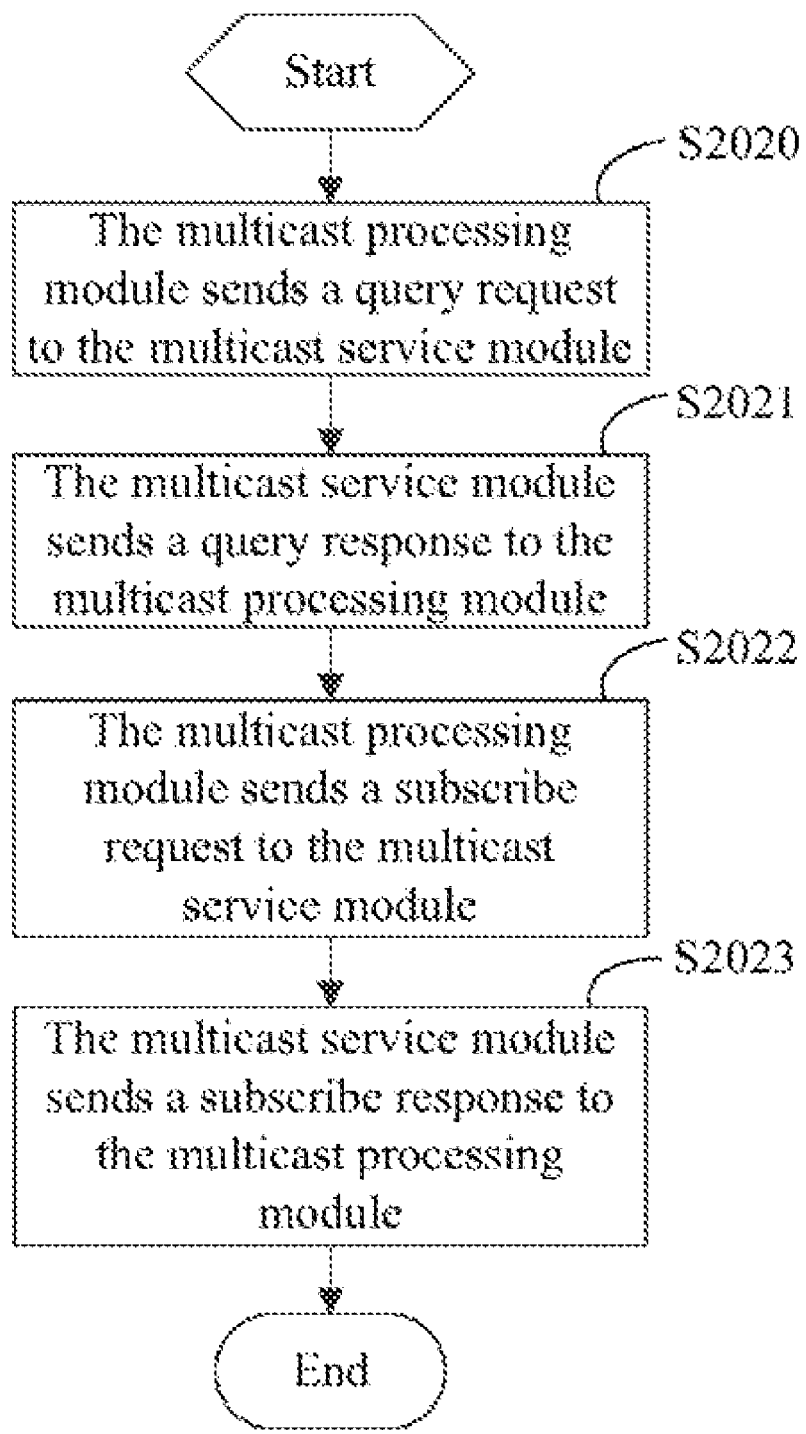
FIG. 3 is a detailed flowchart of step S202 in FIG. 2.

FIG. 3 is a detailed flowchart of step S202 in FIG. 2. In step S2020, the multicast processing module 1400 sends a query request to the multicast service module 1200. In this embodiment, the query request is a query media request.

In step S2021, the multicast service module 1200 sends a query response to the multicast processing module 1400. In this embodiment, the query response is a query media response, which lists all data that may be sent by the multicast service module 1200.

In step S2022, the multicast processing module 1400 sends a subscribe request to the multicast service module 1200. In this embodiment, the subscribe request is a subscribe media request.

In step S2023, the multicast service module 1200 sends a subscribe response to the multicast processing module 1400. In this embodiment, the subscribe response is a subscribe media response.

Figure 4:
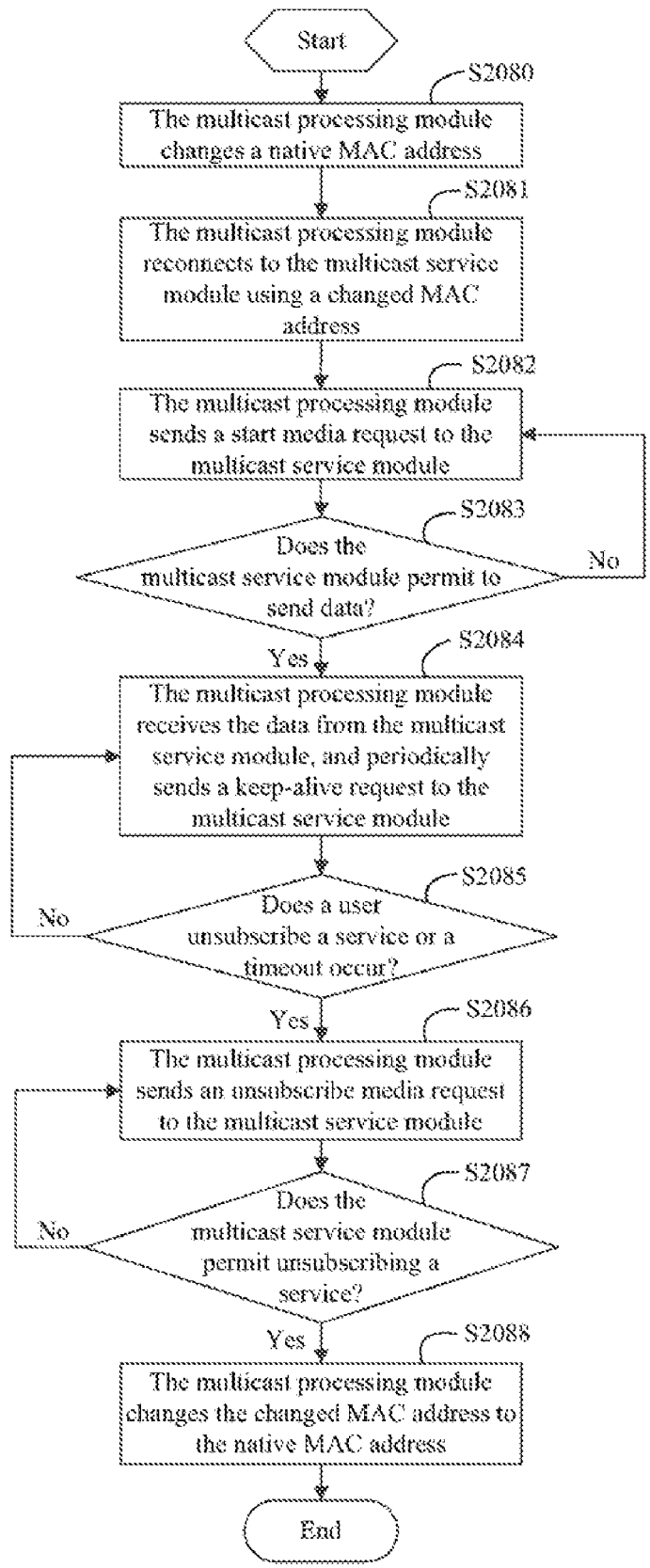
FIG. 4 is a detailed flowchart of step S208 in FIG. 2.

FIG. 4 is a detailed flowchart of step S208 in FIG. 2. In step S2080, the multicast processing module 1400 changes a native MAC address. In this embodiment, the multicast processing module 1400 changes the native MAC address to an identification code of a corresponding data. For example, if the originator of the data 40 is a multicast processing module 1400 with a MAC address of 400, the multicast processing module 1400 changes the MAC address from 400 to 40. In other embodiments, the multicast processing module 1400 may not change the native MAC address, and the process may directly proceed to step S2082 described below.

In step S2081, the multicast processing module 1400 re-communicates with the multicast service module 1200 using the changed MAC address.

In step S2082, the multicast processing module 1400 sends a start media request to the multicast service module 1200 to request the multicast service module 1200 to send data.

In step S2083, the multicast service module 1200 sends a start media response, which informs the multicast processing module 1400 whether the multicast service module 1200 agrees to send the data to the multicast processing module 1400.

If the multicast service module 1200 agrees to send the data, the process proceeds to step S2084, where the multicast processing module 1400 receives the data from the multicast service module 1200, and periodically sends a keep-alive request to the multicast service module 1200.

If the multicast service module 1200 does not agree to send the data, the process returns to step S2082.

In step S2085, the multicast processing module 1400 determines whether a timeout occurs. If the timeout does not occur, the process returns to step S2084. If the timeout occurs, the process proceeds to step S2086.

In step S2086, the multicast processing module 1400 sends an unsubscribe media request to the multicast service module 1200.

In step S2087, the multicast service module 1200 sends an unsubscribe media response, which informs the multicast processing module 1400 whether the multicast service module 1200 permits unsubscribing a service, to the multicast processing module 1400. If the multicast service module 1200 does not permit unsubscribing the service, the process returns to step S2086. If the multicast service module 1200 permits unsubscribing the service, the process proceeds to step S2088.

In step S2088, the multicast processing module 1400 changes the changed MAC address to the native MAC address.

Figure 5:
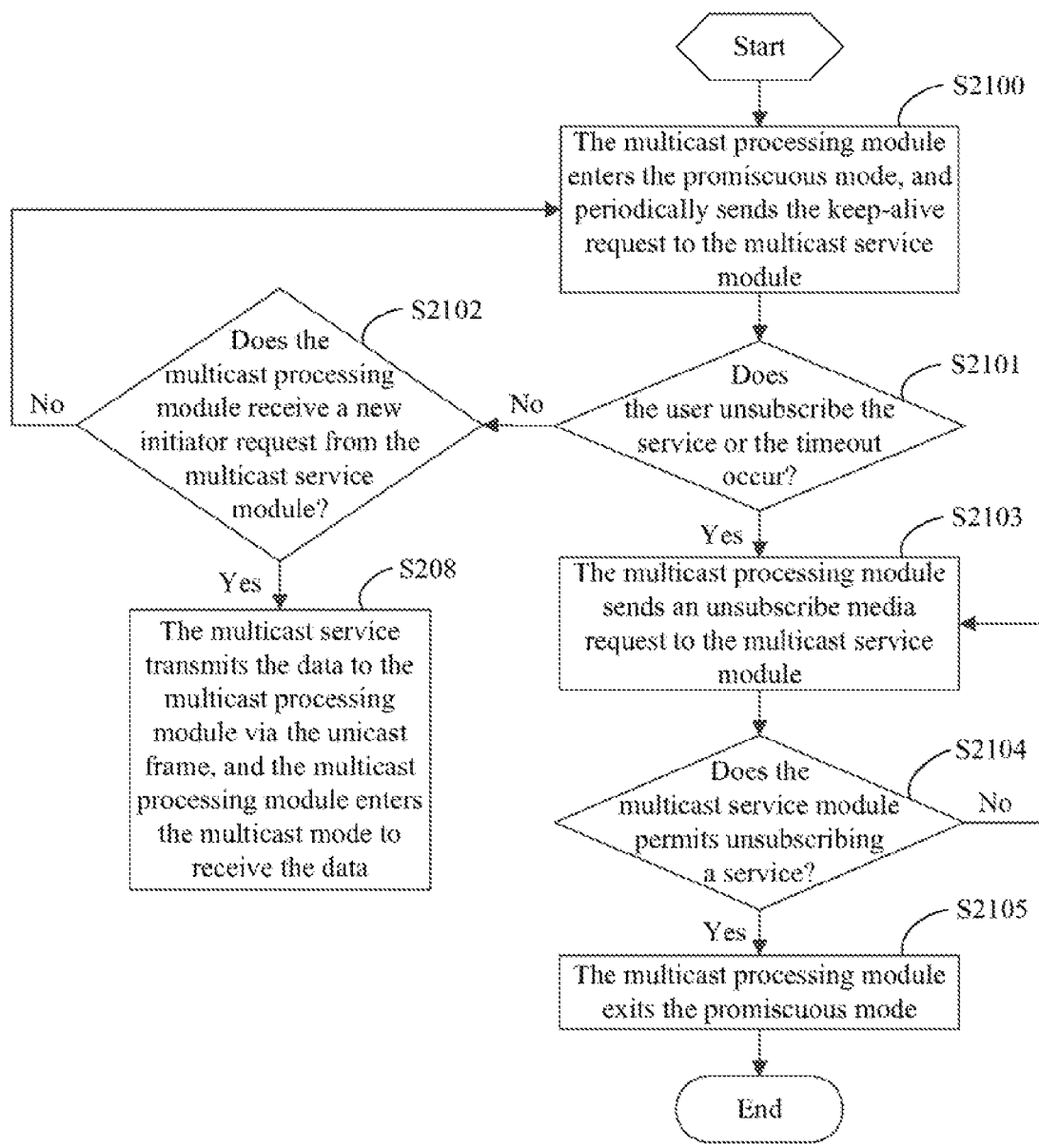
FIG. 5 is a detailed flowchart of step S210 in FIG. 2.

FIG. 5 is a detailed flowchart of step S210 in FIG. 2. In step S2100, the multicast processing module 1400 enters the promiscuous mode, and periodically sends the keep-alive request to the multicast service module 1200.

In step S2101, the multicast processing module 1400 determines whether the timeout occurs. If the timeout does not occur, the process proceeds to step S2102.

In step S2102, the multicast processing module 1400 determines whether the multicast processing module 1400 receives a new initiator request from the multicast service module 1200. If the multicast processing module 1400 receives the new initiator request from the multicast service module 1200, the process returns to step S208 described above. If the multicast processing module 1400 does not receive the new initiator request from the multicast service module 1200, the process returns to step S2100.

In step S2101, If the timeout occurs, the process proceeds to step S2103, where the multicast processing module 1400 sends an unsubscribe media request to the multicast service module 1200.

In step S2104, the multicast service module 1200 sends an unsubscribe media response, which informs the multicast processing module 1400 whether the multicast service module 1200 permits unsubscribing the service, to the multicast processing module 1400. If the multicast service module 1200 does not permit unsubscribing the service, the process returns to step S2103. If the multicast service module 1200 permits unsubscribing the service, the process proceeds to step S2105.

In step S2105, the multicast processing module 1400 exits the promiscuous mode.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments.

What is claimed is:

1. A multicast system, comprising:
a multicast service module; and
a multicast processing module for subscribing to the multicast service module;
wherein the multicast service module sends a subscribe response to the multicast processing module, and transmits data to the multicast processing module via a unicast frame; and
the multicast processing module further identifies whether the multicast processing module itself is a data initiator according to the subscribe response, and receives the data from the multicast service module in a multicast mode if the multicast processing module is the data initiator, or receives the data from the multicast service module, by discarding unnecessary data and only keeping required data, in a promiscuous mode if the multicast processing module is not the data initiator.

2. The multicast system in accordance with claim 1, wherein the multicast system has a multicast table stored therein, and the multicast service module identifies the data initiator via the multicast table.

3. The multicast system in accordance with claim 1, wherein the multicast processing module is farther for communicating with the multicast service module using a native medium access control (MAC) address.

4. The multicast system in accordance with claim 3, wherein the multicast processing module is further for changing an address thereof.

5. The multicast system in accordance with claim 3, wherein the subscribe response comprises a subscribe media response.

6. A multicast method utilized in a multicast system, the multicast system comprising a multicast service module and a multicast processing module, the multicast method comprising:
the multicast processing module subscribing to the multicast service module;
the multicast service module sending a subscribe response to the multicast processing module;
the multicast processing module identifying whether the multicast processing module itself is a data initiator according to the response from the multicast service module; and
the multicast service module sending the data to the multicast processing module via a unicast frame, and the multicast processing module receiving the data from the multicast service module in a multicast mode if the multicast processing module is the data initiator, or receiving the data from the multicast service module, by discarding unnecessary data and only keeping required data, in a promiscuous mode if the multicast processing module is not the data initiator.

7. The multicast method in accordance with claim 6, wherein the multicast service module has a multicast table stored therein, and the multicast service module identifies the data initiator via the multicast table.

8. The multicast method in accordance with claim 6, further comprising the multicast processing module communicating with the multicast service module using a native medium access control (MAC) address.

9. The multicast method in accordance with claim 8, wherein the step of the multicast processing module receiving the data from the multicast service module in a multicast mode comprises:
the multicast processing module changing the native MAC address;
the multicast processing module re-communicating with the multicast service module using a changed MAC address;
the multicast processing module requesting the multicast service module to send the data;
the multicast service module informing the multicast processing module whether the multicast service module agrees to send the data; and
the multicast processing module receiving the data from the multicast service module, and the multicast processing module periodically sending a keep-alive request to the multicast service module if the multicast service module agrees to send the data.

10. The multicast method in accordance with claim 9, further comprising:
the multicast processing module determining whether a timeout occurs;
the multicast service module informing the multicast processing module whether the multicast service module permits unsubscribing a service if the timeout occurs; and
the multicast processing module changing the changed MAC address to a native MAC address if the multicast service module permits unsubscribing the service.

11. The multicast method in accordance with claim 6, wherein the step of the multicast processing module receiving the data from the multicast service module in the promiscuous mode comprises:
the multicast processing module entering the promiscuous mode, and periodically sending the keep-alive request to the multicast service module;
the multicast processing module determining whether the timeout occurs;
the multicast service module informing the multicast processing module whether the multicast service module permits unsubscribing a service if the timeout occurs; and
the multicast processing module exiting the promiscuous mode if the multicast service module permits unsubscribing the service.

12. The multicast method in accordance with claim 11, wherein the step of the multicast processing module receiving the data from the multicast service module in the promiscuous mode further comprises:
the multicast processing module receiving a new initiator request from the multicast service module; and
the multicast processing module receiving the data from the multicast service module in the multicast mode.

* * * * *

UNITED STATES PATENT AND TRADEMARK OFFICE
CERTIFICATE OF CORRECTION

PATENT NO.        : 7,664,065 B2                          Page 1 of 1
APPLICATION NO. : 11/558475
DATED             : February 16, 2010
INVENTOR(S)       : Chi-Ming Lu It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 414 days.

Signed and Sealed this

Thirtieth Day of November, 2010

David J. Kappos
*Director of the United States Patent and Trademark Office*